United States Patent [19]

Paul

[11] Patent Number: 5,312,693
[45] Date of Patent: May 17, 1994

[54] NONSACRIFICIAL LASER HARDENING

[75] Inventor: Donald B. Paul, Bellbrook, Ohio

[73] Assignee: The United States of America as represented by the Secretary of the Air Force, Washington, D.C.

[21] Appl. No.: 867,726

[22] Filed: May 28, 1986

[51] Int. Cl.$^5$ ............... B32B 15/20; B64C 1/38; F41H 5/04
[52] U.S. Cl. .................... 428/554; 428/566; 244/117 A; 244/121; 250/515.1; 89/36.01; 359/845
[58] Field of Search ............ 428/539.5, 553, 554, 428/566; 244/117 R, 117 A, 121; 250/515.1; 376/243; 89/36.11; 350/97, 610, 642; 359/845, 883

[56] References Cited

U.S. PATENT DOCUMENTS

| | | | |
|---|---|---|---|
| 3,754,812 | 8/1973 | Mohn | 350/167 |
| 3,841,737 | 10/1974 | Rambauske et al. | 350/610 |
| 3,871,739 | 3/1975 | Poulsen | 250/515.1 |
| 3,976,890 | 8/1976 | Barnes, Jr. et al. | 350/642 |
| 3,986,690 | 10/1976 | Milling | 244/121 |
| 4,114,985 | 9/1978 | Friedman | 250/515.1 |
| 4,164,339 | 8/1979 | McClenny | 244/163 |
| 4,273,304 | 6/1981 | Frosch et al. | 244/117 A |
| 4,343,533 | 8/1982 | Currin et al. | 350/288 |
| 4,379,196 | 4/1983 | Halper | 350/642 |
| 4,408,833 | 10/1983 | Gowan | 350/610 |
| 4,415,234 | 11/1983 | Meyers | 350/310 |
| 4,431,697 | 2/1984 | Rolinski et al. | 428/242 |
| 4,448,855 | 5/1984 | Senaha et al. | 350/642 |
| 4,482,111 | 11/1984 | LeTouche | 244/117 A |
| 4,482,209 | 11/1984 | Grewal et al. | 350/642 |
| 4,552,439 | 11/1985 | Hoag et al. | 350/610 |
| 4,592,950 | 6/1986 | Le Touche | 244/117 A |

FOREIGN PATENT DOCUMENTS 2086075 5/1982 United Kingdom ............ 250/515.1

Primary Examiner—Peter A. Nelson
Assistant Examiner—Chrisman D. Carroll
Attorney, Agent, or Firm—Fredric L. Sinder; Donald J. Singer

[57] ABSTRACT

A nonsacrifical laser hardened structure and method protects against incident high energy irradiation. A very thin outer face sheet with a reflective outer surface is laminated to a foam core which is further laminated to a support structure. The foam core includes liquid and vapor passages. A supply of liquid working fluid impregnates the foam core. A portion of incident irradiation energy is first reflected from the outer face sheet and substantially all the remaining irradiation energy conducted through the face sheet to be absorbed at the back of the face sheet into heat of vaporization of the liquid working fluid. Additional liquid working fluid is supplied to the back of the face sheet by capillary action through the foam core, and additional liquid working fluid is resupplied to the foam core through the liquid passages. Working fluid vapor is removed through the foam vapor passages. Another embodiment of the invention includes a highly reflective coating as the reflective outer surface of the outer face sheet. The preferred embodiment uses sintered aluminum as the foam core. The liquid working fluid may be supplied under pressure from a central storage area.

8 Claims, 1 Drawing Sheet

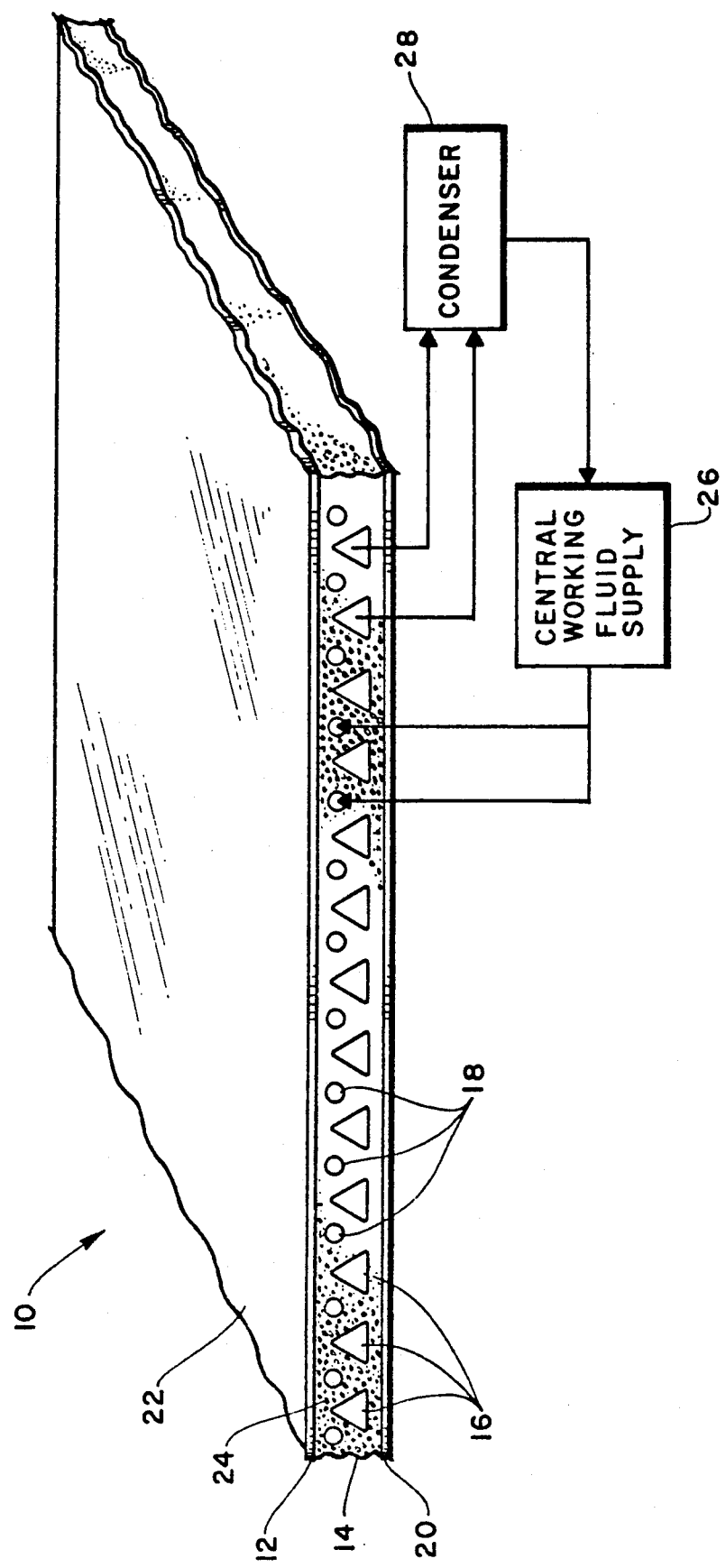

NONSACRIFICIAL LASER HARDENING

RIGHTS OF THE GOVERNMENT

The invention described herein may be manufactured and used by or for the Government of the United States for all governmental purposes without the payment of any royalty.

BACKGROUND OF THE INVENTION

The present invention relates generally to laser hardened structures, and more specifically to nonsacrificial laser hardened structures.

Protection of aircraft and spacecraft from high energy laser irradiation can be accomplished by laser hardening of the outer surface of the craft. Prior art laser hardening absorbs laser irradiation primarily by solid to gas transition of sacrificial materials. This requires using very conservative amounts of material and covering the energy absorbing material over the entire surface to be protected. Therefore, the weight of required material may be prohibitive.

Additionally, the use of sacrificial material limits the ability to protect against repeated or sustained laser irradiation.

It is, therefore, a principal object of the present invention to provide a laser hardened structure that absorbs laser energy without sacrificing material.

Another object of the present invention is to provide a lightweight laser hardened structure.

A feature of the present invention is that additional energy absorbing material can be stored in a central location and automatically supplied to the area encountering the laser attack.

An advantage of the present invention is that it is effective against sustained or repeated laser irradiation.

Another advantage of the present invention is that it can be made to serve as a load bearing member of the structure of the craft.

These and other objects, features, and advantages of the present invention will become apparent as the detailed description of the certain representative embodiments proceeds.

SUMMARY OF THE INVENTION

In accordance with the foregoing principles and objects of the present invention, a novel laser hardened structure and method of use is described which comprises using a very thin outer face sheet with a reflective outer surface laminated to a foam core which is further laminated to a support structure. The foam core includes liquid and vapor passages. A supply of liquid working fluid impregnates the foam core. A portion of incident irradiation energy is first reflected from the outer face sheet, then substantially all the remaining irradiation energy is conducted through the face sheet and absorbed at the back of the face sheet into heat of vaporization of the liquid working fluid. Additional liquid working fluid is supplied to the back of the face sheet by capillary action through the foam core, and additional liquid working fluid is resupplied to the foam core through the liquid passages. Working fluid vapor is removed through the foam vapor passages.

The invention also includes a highly reflective coating as the reflective outer surface of the outer face sheet.

The invention further includes making the foam core from sintered aluminum.

The invention additionally includes means for resupplying liquid working fluid under pressure from a central storage area.

DESCRIPTION OF THE DRAWINGS

The present invention will be more clearly understood from a reading of the following detailed description in conjunction with the accompanying drawing wherein the FIGURE is a perspective view of a section of a laser hardened structure incorporating the teachings of the present invention.

DETAILED DESCRIPTION

Referring now to the FIGURE in the drawings, there is shown a perspective view of a section 10 of a laser hardened structure incorporating the teachings of the present invention. The structure comprises a very thin face sheet 12 backed and supported by a foam core 14 having vapor passages 16 and liquid passages 18. The foam core 14 is itself backed by a support 20, which may be part of an aircraft structure or an equipment case. For clarity, the face sheet 12 is shown proportionately thicker in the FIGURE than is intended for actual use. The surface 22 of the face sheet 12 is very reflective, either by polishing or by a suitable reflective coating. The foam core 14 is impregnated with a working fluid 24, which is the energy absorbing material.

In use, laser, or other high intensity irradiation, impinges upon the surface 22 of the face sheet 12. The majority of the incident energy is reflected from the surface 22. The remaining energy passes through the face sheet 12 where, at the back surface of the face sheet 12, it evaporates liquid working fluid 24. The resulting working fluid vapor is removed through vapor passages 16 and replacement liquid working fluid is supplied to the back of the face sheet 12 by capillary action through the foam core 14. Additional liquid working fluid 24 is resupplied to the foam core 14 through the liquid passages 18.

The face sheet 12 must be very thin to minimize the temperature gradient across its thickness. Because the temperature at the back surface of the face sheet 12 will be largely constrained to the vaporization temperature of the working fluid, minimizing the temperature gradient will prevent the temperature of the front face from rising above the melting point of face sheet 12.

Sintered aluminum has been successfully tested as the foam core 14 material, sintered aluminum is particularly useful in that it can also function as a load bearing member of the structure. It will be seen by those skilled in the art that the structure shown in the FIGURE approximates a stressed skin or honeycomb wall structure, such as is commonly used in existing aircraft. The weight of the laser hardened structure is effectively reduced by its ability to be part of the aircraft or spacecraft load bearing structure.

The tested structure was formed of two approximately 1/16 inch thick aluminum sheets on either side of a sintered aluminum foam core approximately 7/16 inches thick. The sintered aluminum core was formed by pouring powdered aluminum around a mandrel to form the liquid and vapor passages, and then heating the aluminum powder until it sintered. The mandrel was first placed between the two aluminum sheets to form a mold so that upon heating the laser hardened structure would be made in one step. The tested structure was made relatively thick to simplify construction of the first test structure. In actual use, typical skin thicknesses are expected to be in the range 0.005 to 0.010 inches, with thinner or thicker skins as may be required to solve particular problems. The thickness of an entire laser hardened structure, comprising two skins surrounding a single foam core, is expected to be in the range of 0.10 to 0.25 inches. The thinner structures are expected to be used where significant load-bearing capability is not required. It is also expected that the use of very thin skins and cores will require, rather than the single step procedure used for the tested structure, that the skins and cores be made separately and then joined.

In the event of sustained or repeated high energy irradiation, additional liquid working fluid may be supplied from a central working fluid supply 26 interconnected with fluid passages 18. This resupply liquid working fluid may be pressurized to ensure rapid redelivery of liquid. If necessary, apparatus, shown schematically as 28, for condensing and returning the vapor to the central supply may be added. In normal operation, however, condensation of working fluid vapor and resupply to the back of the irradiated surface would not occur fast enough to provide adequate protection. Sufficient new liquid working fluid must be available to resupply the foam core 14 and the back surface of the irradiated face sheet 22.

Suitable working fluids include, but are not limited to, water and ammonia.

The particular shapes and sizes of the vapor 16 and liquid 18 passages may be changed to emphasize one function over another. Upon comprehending this invention, those persons skilled in the art, and seeking to provide solutions to problems faced by them, will find obvious the selection of various shapes and sizes of passages corresponding to their particular needs. For example, the need for a lighter and stronger structure may require a structure more closely resembling an aircraft skin honeycomb structure, while the need for faster working fluid resupply may call for larger liquid passages located closer to the back surface of the face sheet 12.

It will also be seen by those with skill in the art that the disclosed structure, either standing alone, or combined with a central supply of working fluid and condensing apparatus, can function as a flat heat pipe.

While the apparatus and method herein described constitute a preferred embodiment of the invention, it is to be understood that the invention is not limited to this precise form of apparatus or method, and that changes may be made therein without departing from the scope of the invention as defined in the claims.

I claim:

1. A laminate structure hardened against the effects of laser irradiation, comprising:
    (a) a face sheet having a front surface and a back surface, the front surface having a high reflectivity to said laser irradiation so that a substantial portion of the energy of said laser irradiation is reflected away from said front surface;
    (b) a liquid heat transfer working fluid covering the back surface of the face sheet so that a substantial portion of the energy of the said laser irradiation is absorbed into the liquid heat transfer working fluid to vaporize said liquid to transform said irradiation energy into heat of vaporization of the heat transfer working fluid;
    (c) a porous foam core adjacent to the back surface of the face sheet;
    (d) a supply of liquid heat transfer working fluid impregnating the foam core for supplying said liquid to the back surface of the face sheet to replace vaporized liquid heat transfer fluid;
    (e) a first set of passages through the foam core for supplying liquid heat transfer working fluid to the foam core;
    (f) a second set of passages through the foam core for removing vaporized heat transfer working fluid from the foam core; and,
    (g) a supporting structure adjacent to the foam core.

2. A laminate structure according to claim 1, further comprising a coating for providing said high reflectivity to the front surface of the face sheet.

3. A laminate structure according to claim 1, wherein the foam core comprises sintered aluminum.

4. A laminate structure according to claim 1, further comprising a central heat transfer working fluid storage area interconnecting said first and second sets of passages.

5. A laminate structure according to claim 4, further comprising means for condensing vaporized heat transfer working fluid, received from said second set of passages, into liquid heat transfer working fluid and supplying said liquid to the central heat transfer working fluid storage area.

6. A laminate structure according to claim 4, further comprising means for pressurizing the liquid heat transfer working fluid.

7. A method of protecting a structure from high energy irradiation, comprising the steps of:
    (a) reflecting a portion of the irradiation energy at the outer surface of the structure;
    (b) conducting substantially all the remaining irradiation energy through a thin outer sheet;
    (c) absorbing substantially all the conducted irradiation energy into a liquid heat transfer working fluid supplied to the back of the thin outer sheet so that the heat transfer working fluid vaporizes to transform the conducted irradiation energy primarily into heat of vaporization of the heat transfer working fluid;
    (d) storing the heat transfer working fluid as a liquid in a porous foam adjacent to the thin outer sheet;
    (e) resupplying vaporized liquid heat transfer working fluid to the back of the thin outer sheet by capillary action through the foam;
    (f) supplying liquid heat transfer working fluid to the foam through liquid passages in the foam; and,
    (g) removing vaporized heat transfer working fluid through vapor passages in the foam.

8. A method of protecting a structure from high energy irradiation according to claim 7, further comprising the step of supplying the the liquid heat transfer working fluid through the liquid passages under pressure.

* * * * *